(12) United States Patent
Kimoto et al.

(10) Patent No.: US 12,416,612 B2
(45) Date of Patent: Sep. 16, 2025

(54) GAS CHROMATOGRAPH WITH A HOUSING INCLUDING AN OPERATION RECEPTION UNIT

(71) Applicant: Shimadzu Corporation, Kyoto (JP)

(72) Inventors: Yasuhiro Kimoto, Kyoto (JP); Masashi Yamane, Kyoto (JP); Shingo Masuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 313 days.

(21) Appl. No.: 17/989,569

(22) Filed: Nov. 17, 2022

(65) Prior Publication Data
US 2023/0296573 A1    Sep. 21, 2023

(30) Foreign Application Priority Data
Mar. 18, 2022    (JP) .................. 2022-043426

(51) Int. Cl.
*G01N 30/88*    (2006.01)
*G01N 27/62*    (2021.01)
*G01N 30/54*    (2006.01)

(52) U.S. Cl.
CPC ............. *G01N 30/88* (2013.01); *G01N 27/62* (2013.01); *G01N 30/54* (2013.01)

(58) Field of Classification Search
CPC ........ G01N 30/88; G01N 27/62; G01N 30/54; G01N 30/7206; G01N 30/86; G01N 2030/8804
See application file for complete search history.

(56) References Cited

U.S. PATENT DOCUMENTS

2004/0144159 A1* 7/2004 Stewart .................. G01N 30/88
                                                              73/23.36
2023/0417781 A1* 12/2023 Katano .................. G01N 30/88

FOREIGN PATENT DOCUMENTS

CN    113508294 A    * 10/2021    ............. G01N 30/30
JP    H10-48190 A    2/1998

* cited by examiner

*Primary Examiner* — Timothy P Graves
(74) *Attorney, Agent, or Firm* — Muir Patent Law, PLLC

(57) ABSTRACT

A gas chromatograph is provided with a communication unit, a setting processing unit, a first operation reception unit, and a maintenance processing unit. The communication unit communicates with an outside. The setting processing unit sets any one of the plurality of maintenance modes to a default maintenance mode in response to an input from the outside via the communication unit. The first operation reception unit is provided in the housing and is configured to accept a progress operation for progressing a maintenance sequence corresponding to the default maintenance mode. The maintenance processing unit progresses the maintenance sequence stepwise each time the progress operation is accepted by the first operation reception unit. The first operation reception unit is commonly used even in a case where any one of the plurality of maintenance modes is set to the default maintenance mode.

19 Claims, 7 Drawing Sheets

GAS CHROMATOGRAPH WITH A HOUSING INCLUDING AN OPERATION RECEPTION UNIT

CROSS-REFERENCE TO RELATED APPLICATIONS

This application claims priority under 35 U.S.C. § 119 to Japanese Patent Application No. 2022-043426 filed on Mar. 18, 2022, the entire disclosure of which is incorporated herein by reference in its entirety.

BACKGROUND OF THE INVENTION

Field of the Invention

The present invention relates to a gas chromatograph capable of setting a plurality of maintenance modes.

Description of Related Art

The following description sets forth the inventor's knowledge of related art and problems therein and should not be construed as an admission of knowledge in the prior art.

For example, the gas chromatograph disclosed in Patent Document 1 listed below has, as one example of a maintenance mode, a mode for automatically cooling a column for replacing the column. Some gas chromatographs are configured to select one of a plurality of maintenance modes to be executed by operating an information processing terminal connected to the gas chromatograph via a network.

PRIOR ART DOCUMENT

Patent Document

Patent Document 1: Japanese Unexamined Patent Application Publication No. H10-48190

SUMMARY OF THE INVENTION

Problems to be Solved by the Invention

When performing maintenance of a gas chromatograph, it is required to perform a plurality of steps. The plurality of steps includes, for example, a step of operating an information processing terminal and a step of replacing a component equipped in the gas chromatograph. Specifically, the operating the information processing terminal is an operation of a maintenance screen serving as a screen displayed on the information processing terminal and a screen for proceeding the plurality of steps.

At the time of such maintenance of the gas chromatograph, it is required for the person performing the maintenance to go back and forth between the information processing terminal and the gas chromatograph, which is troublesome.

Under the circumstances, it is conceivable to directly connect a portable information processing terminal to the gas chromatograph and perform the maintenance while operating the maintenance screen displayed on the information processing terminal in the vicinity of the gas chromatograph. However, it is relatively rare to change the maintenance mode, and the operation of connecting the information processing terminal to the gas chromatograph every time the maintenance is performed is also troublesome.

The present invention has been made in view of the above circumstances. An object of the present invention is to provide a gas chromatograph capable of setting a maintenance mode in advance and thereafter performing component maintenance with a simple operation on a device body.

Means for Solving the Problem

According to one aspect of the present invention, a gas chromatograph capable of setting a plurality of maintenance modes for a component provided in a housing is provided with:
  a communication unit configured to communicate with an outside;
  a setting processing unit configured to set any one of the plurality of maintenance modes to a default maintenance mode in response to an input from the outside via the communication unit;
  a first operation reception unit provided in the housing, the first operation reception unit being configured to accept a progress operation for progressing a maintenance sequence corresponding to the default maintenance mode; and
  a maintenance processing unit configured to progress the maintenance sequence stepwise each time the progress operation is accepted by the first operation reception unit,
  wherein the first operation reception unit is commonly used even in a case where any one of the plurality of maintenance modes is set to the default maintenance mode.

Effects of the Invention

According to the present invention, it is possible to set a maintenance mode in advance and progress the maintenance of the component with a simple operation on the device body.

BRIEF DESCRIPTION OF THE DRAWINGS

The preferred embodiments of the present invention are shown by way of example, and not limitation, in the accompanying figures.

DESCRIPTION OF THE PREFERRED EMBODIMENT

Figure 1:
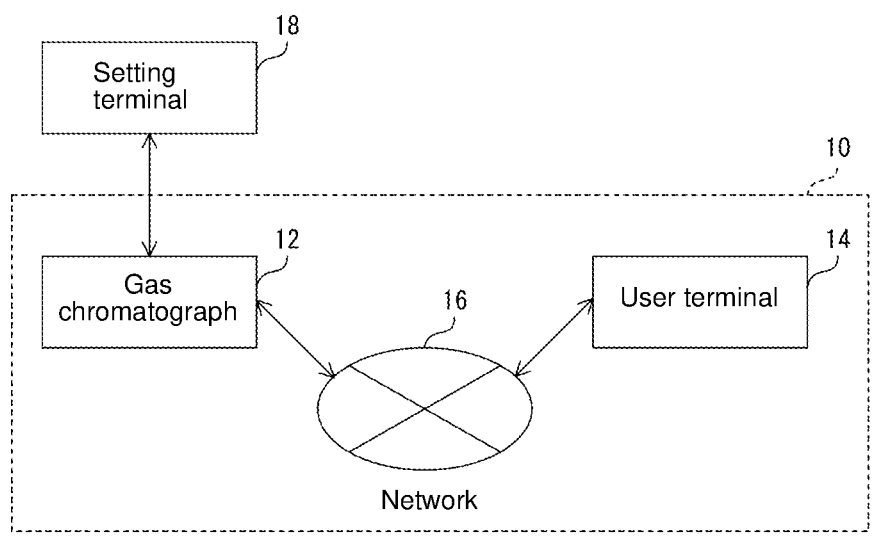
FIG. 1 is a block diagram showing one example of a gas chromatograph system according to an embodiment.

Hereinafter, some embodiments of the present disclosure will be described in detail with reference to the attached drawings. In the drawings, the same or corresponding component is assigned by the same reference symbol, and the description thereof will not be repeated.

1. Peripheral Configuration of Gas Chromatograph

FIG. 1 is a block diagram showing one example of a gas chromatograph system 10 according to this embodiment. As shown in FIG. 1, the gas chromatograph system 10 is provided with a gas chromatograph 12 and a user terminal 14.

The gas chromatograph 12 is a device for separating components contained in a gas sample (sample gas) for each component and detecting various components as needed.

The user terminal 14 is a device provided with at least a CPU, a communication unit for communicating with the outside, a nonvolatile memory, and the like. The user terminal 14 is configured by a desktop PC (Personal Computer), a laptop PC, a smartphone, a tablet PC, and the like.

The gas chromatograph 12 and the user terminal 14 are connected to each other via a network 16, such as, e.g., a LAN (Local Area Network), a WAN (Wide Area Network), and the Internet. Further, the gas chromatograph 12 and the user terminal 14 may be directly connected to each other in a communicable manner by wire or wirelessly.

Further, in some cases, a setting terminal 18 is directly connected to the gas chromatograph system 10, specifically the gas chromatograph 12, in a communicable manner by wire or wirelessly. The setting terminal 18 is a device similar to the user terminal 14 and is used to set setting items related to the gas chromatograph 12.

For example, when the maintenance of the gas chromatograph 12 is performed by a service engineer, the setting terminal 18 is connected to the gas chromatograph 12. Note that the setting terminal 18 may be connected to the gas chromatograph 12 via a predetermined network.

2. Configuration of Gas Chromatograph

Figure 2:
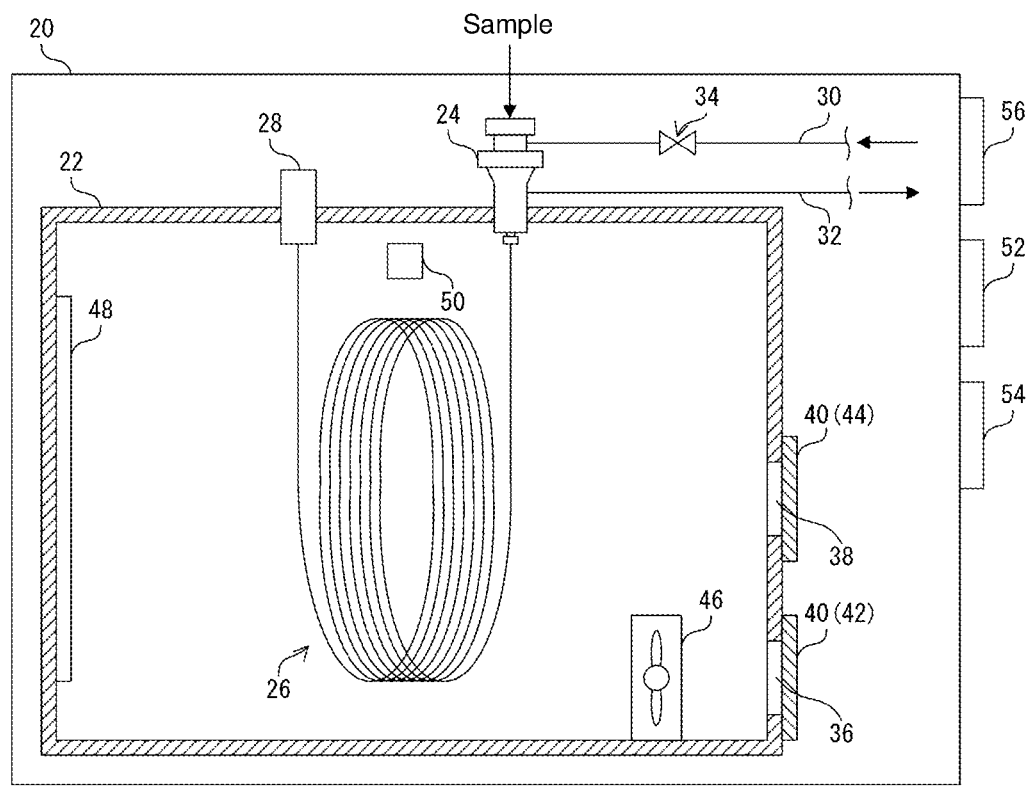
FIG. 2 is a schematic cross-sectional view showing one example of a configuration of the gas chromatograph of the embodiment.

FIG. 2 is a schematic cross-sectional view showing one example of the configuration of the gas chromatograph 12 according to this embodiment. The gas chromatograph 12 is provided with a column oven 22, a sample introduction unit 24, a column 26, and a detector 28. These are provided in a housing 20. Specifically, the sample introduction unit 24, the column 26, and the detector 28 are provided in the column oven 22.

The sample introduction unit 24 is a sample introduction unit (SPL) for introducing a carrier gas and a sample gas into the column 26. To the sample introduction unit 24, a sample is supplied. The sample may be a liquid or a gas. That is, to the sample introduction unit 24, a liquid sample or a sample gas is supplied. In a case where a liquid sample is supplied to the sample introduction unit 24, the liquid sample is vaporized and introduced into the column 26 as a sample gas.

A gas supply flow path 30 and a split flow path 32 communicate with the inside of the sample introduction unit 24. The gas supply flow path 30 is a flow path for supplying a carrier gas into the sample introduction unit 24. Further, the gas supply flow path 30 is provided with an electrically controllable valve 34 such that the supply of the carrier gas can be stopped as appropriate.

The split flow path 32 is a flow path for discharging a part of the gas (a mixed gas of the carrier gas and the sample gas) in the sample introduction unit 24 to the outside at a predetermined split rate when the carrier gas and the sample gas are introduced into the column 26 by a split introduction method.

The detector 28 is provided for sequentially detecting various components separated by the column 26. The detector 28 is configured by, for example, a hydrogen flame ionization detector (FID).

An opening-and-closing mechanism 40 for opening and closing an air inlet port 36 and an air outlet port 38 is provided outside the column oven 22. The opening-and-closing mechanism 40 includes an air inlet flap 42 that opens and closes the air inlet port 36 and an air outlet flap 44 that opens and closes the air outlet port 38. Further, a fan 46, a heater 48, and a temperature sensor 50 are provided in the column oven 22.

When heating the column oven 22, the air inlet flap 42 and the air outlet flap 44 are closed, the fan 46 is activated, and the heater 48 is turned on. The air heated by the heater 48 circulates in the column oven 22, so that the inside of the column oven 22 is heated. The sample introduction unit 24, the column 26, and the detector 28 are also heated in the same manner.

When cooling the column oven 22, the air inlet flap 42 and the air outlet flap 44 are opened, and the fan 46 is activated. The air taken in from the air inlet port 36 circulates within the column oven 22, and the air is discharged from the air outlet port 38, so that the column oven 22 is cooled. The sample introduction unit 24, the column 26, and the detector 28 are also cooled in the same manner.

The temperature sensor 50 is a general-purpose temperature sensor and is provided to monitor the temperature in the column oven 22.

Further, in this embodiment, a first operation reception unit 52, a second operation reception unit 54, and a notification unit 56 are provided on the outer side of the gas chromatograph 12, specifically on the outer side of the housing 20.

The first operation reception unit 52 is provided to accept a predetermined operation related to the maintenance of the gas chromatograph 12. The first operation reception unit 52 is not particularly limited as long as it serves as a button.

As the first operation reception unit 52, for example, a mechanical button, a pressure sensitive button, a capacitive button, or the like can be used. Further, as the first operation reception unit 52, a touch panel display that displays a button reproduced by software may be used.

Like the first operation reception unit 52, the second operation reception unit 54 is provided to accept a predetermined operation related to the maintenance of the gas chromatograph 12. The second operation reception unit 54 is not particularly limited as long as it serves as a button.

The notification unit 56 is provided to notify the operator of the progress status of the maintenance of the gas chromatograph 12. In the case of visually notifying the progress status of the maintenance of the gas chromatograph 12, a light-emitting member, such as, e.g., an LED (light emitting diode) and a display, can be used as the notification unit 56.

Further, in the case of audibly notifying the progress status of the maintenance of the gas chromatograph 12, a sound-generating member, such as, e.g., a speaker, can be used as the notification unit 56. Further, in this case, the notification unit 56 may be provided in the housing 20. Note that the notification unit 56 is not particularly limited as long as the progress status of the maintenance of the gas chromatograph 12 can be notified.

Figure 3:
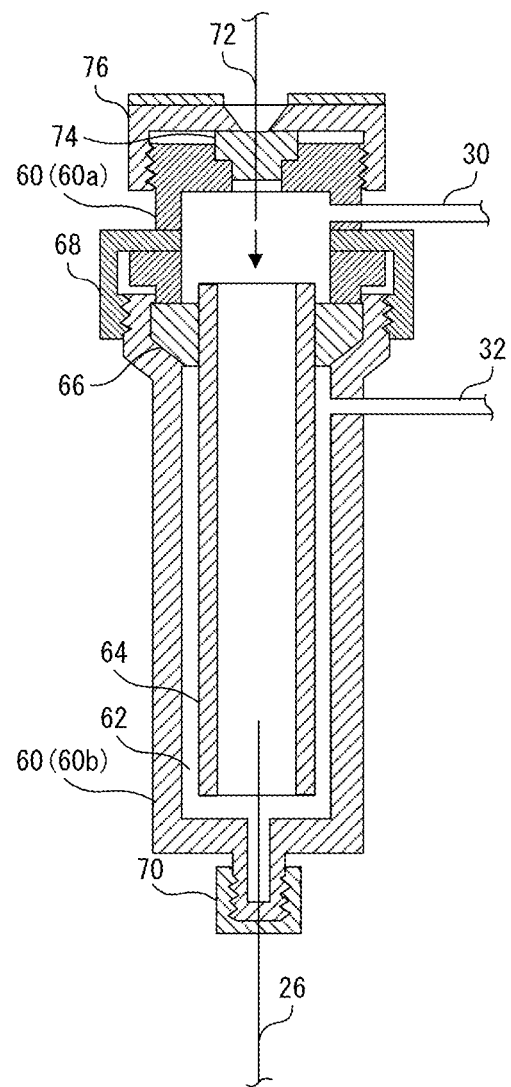
FIG. 3 is a schematic cross-sectional view showing one example of a configuration of a sample introduction unit of the embodiment.

FIG. 3 is a schematic cross-sectional view showing one example of the configuration of the sample introduction unit 24 according to this embodiment. The body 60 of the sample introduction unit 24 is formed in a hollow shape and has a sample vaporization chamber 62 therein. In the example shown in FIG. 3, the body 60 is divided into a first body 60a and a second body 60b.

The gas supply flow path 30 is in communication with the sample vaporization chamber 62 from the first body 60a, and the split flow path 32 is in communication with the sample vaporization chamber 62 from the second body 60b. In the body 60, an insert 64 formed of, for example, a cylindrical glass is arranged in a state of being held by a ring-shaped sealing ring 66.

The first body 60a and the second body 60b are connected to each other by tightening a seal cap 68 through which the first body 60a is inserted. The replacement of the insert 64 or the like is enabled by removing the seal cap 68 to open the sample vaporization chamber 62.

The column 26 is attached to the body 60 by tightening the column cap 70, through which the column 26 is inserted, to the end of the second body 60b opposite to the first body 60a. When the column 26 is attached to the body 60, the column 26 is held in the sample vaporization chamber 62, specifically in the insert 64.

Such a column cap 70 is also provided to the detector 28, so that the replacement of the column 26 and the detector 28 can be performed by removing the column cap 70.

A sample is supplied to the sample introduction unit 24 via a needle 72. The needle 72 is inserted into a septum 74 through an opening formed in the septum cap 76. The needle 72 is inserted into the septum 74, and a sample is supplied from the tip end of the needle 72.

Note that in accordance with the supply of the sample, the hole formed in the septum 74 is blocked by the elasticity of the septum 74. Further, since the septum cap 76 is detachably attached to the body 60, the replacement of the septum 74 can be performed by removing the septum cap 76.

3. Electrical Configuration of Gas Chromatograph

Figure 4:
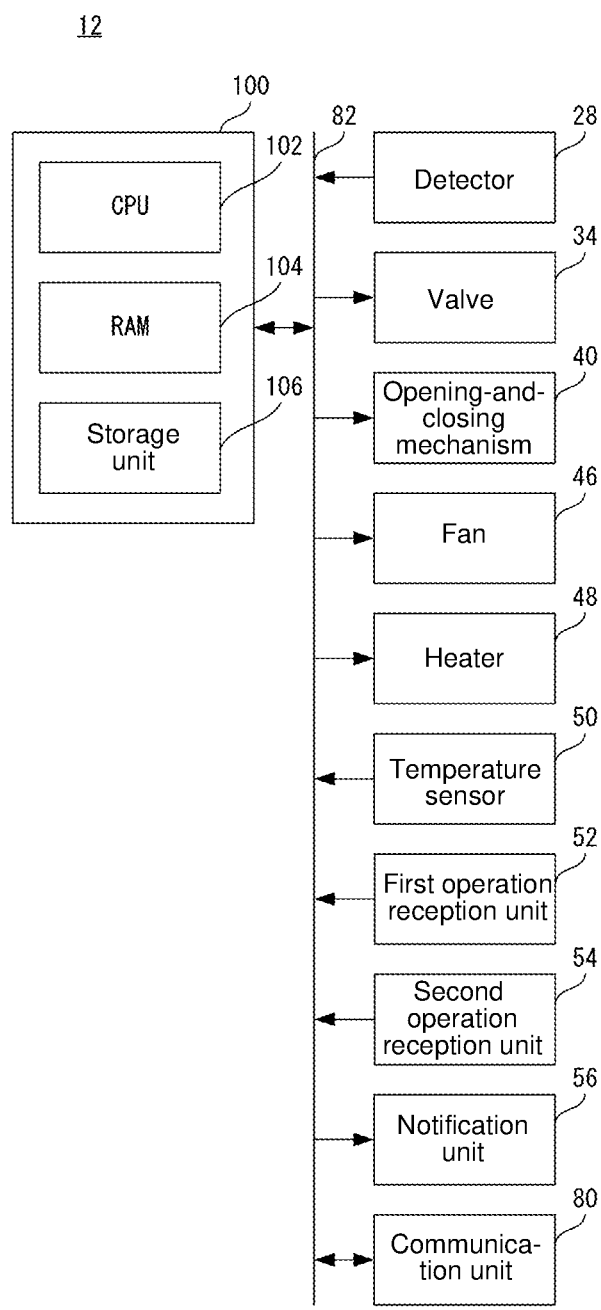
FIG. 4 is a block diagram showing one example of an electric configuration of the gas chromatograph according to the embodiment.

FIG. 4 is a block diagram showing one example of the electric configuration of the gas chromatograph 12 according to this embodiment. The gas chromatograph 12 is provided with a communication unit 80, a controller 100, etc., in addition to the detector 28, the valve 34, and the like.

Further, the controller 100, the detector 28, the valve 34, the opening-and-closing mechanism 40, the fan 46, the heater 48, the temperature sensor 50, the first operation reception unit 52, the second operation reception unit 54, the notification unit 56, and the communication unit 80 are electrically connected to each other via the circuitry 82, such as, e.g., a bus.

The communication unit 80 includes communication circuitry for connecting to the communication module or the network 16 by wire or wirelessly. The communication unit 80 communicates with the outside directly or via the network 16 in accordance with the instruction from the controller 100.

Note that the communication unit 80 may be capable of communicating with an external storage medium. Examples of the external storage medium include a semiconductor medium, such as, e.g., a USB (Universal Serial Bus) memory and an SD (Secure Digital) memory card, and an optical disk medium, such as, e.g., a CD (Compact Disc) or a DVD (Digital Versatile Disc).

The controller 100 is responsible for the overall control of the gas chromatograph 12. The controller 100 is provided with a CPU (Central Processing Unit) 102. Further, the controller 100 is provided with a RAM (Random Access Memory) 104 and a storage unit 106 that are directly accessible to the CPU 102.

The RAM 104 is used as a work area and a buffer area of the CPU 102. The storage unit 106 is a nonvolatile memory. For example, an HDD (Hard Disc Drive), an SSD (Solid State Drive), or the like is used as the storage unit 106.

The storage unit 106 stores a control program for controlling the gas chromatograph 12, data (execution data) required for executing the control program, and the like. Note that the storage unit 106 may be configured to include the RAM 104.

4. Maintenance Mode

The gas chromatograph 12 of this embodiment can set a plurality of maintenance modes for a component provided in the housing 20. The component provided in the housing 20 specifically refers to a component (maintenance component) to be maintained. Examples of the maintenance component include the sample introduction unit 24, the column 26, and the detector 28.

Any one of the plurality of maintenance modes is set to a default maintenance mode. The default maintenance mode is set in response to an input from the outside. For example, the default maintenance mode is set by operating the setting terminal 18. The default maintenance mode is a maintenance mode to be set in advance prior to the maintenance.

Further, for example, the default maintenance mode may be set by operating the user terminal 14. Alternatively, it may be configured such that when the communication unit 80 and an external storage medium are communicably connected, the default maintenance mode is set by acquiring setting information from the external storage medium.

For each of the plurality of maintenance modes, there is a corresponding maintenance sequence. The maintenance sequence includes cooling processing for cooling the maintenance component and gas stop processing for stopping the supply of the carrier gas. The maintenance sequence (default sequence) corresponding to the default maintenance mode can perform the progress or the cancellation of the progress at any timing.

In this embodiment, the first operation reception unit 52 specifically accepts a progress operation. The progress operation is an operation for progressing the default sequence. The default sequence proceeds stepwise each time a progress operation is accepted by the first operation reception unit 52.

The progress operation includes at least an operation of bringing a finger closer to the first operation reception unit 52. For example, in a case where a capacitive button, a touch panel display, or the like is used as the first operation reception unit 52, the progress operation may include only an operation of bringing a finger closer to the first operation reception unit 52, or may further include an operation of touching the first operation reception unit 52 with the finger. Also, in a case where a mechanical button, a pressure-sensitive button, or the like is used as the first operation reception unit 52, the progress operation includes an operation of bringing a finger closer to the first operation reception unit 52, an operation of touching the first operation reception unit 52 with a finger, and an operation of pressing the first operation reception unit 52 with a finger.

In this embodiment, the second operation reception unit 54 specifically accepts a cancellation operation. The cancellation operation is an operation for canceling the progress of the default sequence. Further, since the second operation reception unit 54 has the same configuration as that of the first operation reception unit 52, the cancellation operation can be performed in the same manner as that of the progress operation.

The first operation reception unit 52 is commonly used even in a case where any one of the plurality of maintenance modes is set to the default maintenance mode. That is, the plurality of maintenance modes does not progress by operating different first operation reception units 52 but progress by operating a common first operation reception unit 52. However, in a maintenance sequence corresponding to each maintenance mode, the numbers of processing to be progressed stepwise may differ. For this reason, in some cases, the number of times the first operation reception unit 52 is operated until the end of the default sequence may differ depending on the maintenance sequence set as the default sequence.

Further, the notification unit 56 in this embodiment specifically notifies the progress status of the default sequence. With respect to the progress status of the default sequence, each of the plurality of processing to be progressed in a stepwise manner is notified in an identifiable manner.

For example, in the case of audibly notifying the progress status of the default sequence, a simple sound corresponding to the progress status may be emitted from the notification unit 56, or a voice-message may be emitted. Further, for example, in the case of visually notifying the progress status of the default sequence, the notification unit 56 may emit colored light corresponding to the progress status, a light emission pattern of the notification unit 56 may be changed according to the progress status, or a message corresponding to the progress status may be displayed by the notification unit 56.

The plurality of maintenance modes includes a maintenance mode (manual stop mode) and a maintenance mode (automatic stop mode). The maintenance mode (manual stop mode) is a mode for stopping the supply of the carrier gas by accepting a progress operation by the first operation reception unit 52. The maintenance mode (automatic stop mode) is a mode for automatically stopping the supply of the carrier gas without accepting a progress operation by the first operation reception unit 52. Hereinafter, a series of flows will be described by exemplifying the case in which a manual stop mode is set to a default maintenance mode.

When a progress operation is accepted by the first operation reception unit 52 and that the default sequence is started, the cooling processing for cooling the maintenance component is executed. In this embodiment, when the cooling processing is executed, the opening-and-closing mechanism 40, the fan 46, and the like are appropriately controlled, so that the sample introduction unit 24, the column 26, and the detector 28 are cooled.

Upon completion of the cooling of the maintenance component, the notification unit 56 notifies that the following progress operation can be accepted. The determination of whether the cooling of the maintenance component has been completed is made based on the detection temperature of the temperature sensor 50. Note that the cooling method of the maintenance component is not particularly limited. Further, there is no particular limitation on how to determine whether the cooling of the maintenance component has been completed.

When the following progress operation is accepted by the first operation reception unit 52, the gas stop processing is executed. In this embodiment, when the gas stop processing is executed, the valve 34 switches from the open state to the closed state, so that the supply of the carrier gas is stopped.

In addition, the notification unit 56 notifies that the replacement of the maintenance component can be performed. Note that the replacement of the maintenance component refers to the replacement of the maintenance component itself and the replacement of a partial member constituting the maintenance component.

When the replacement of the maintenance component is completed and that the next progress operation is accepted by the first operation reception unit 52, the default sequence is terminated, and the gas chromatograph 12 returns to the state before the default sequence is started.

The maintenance sequence corresponding to the automatic stop mode is the same as the maintenance sequence corresponding to the manual stop mode except for a part of the processing. Different from the manual stop mode, in a case where the automatic stop mode is set to the default maintenance mode, when the default sequence is started, the gas stop processing is executed without accepting a progress operation by the first operation reception unit 52 after executing the cooling processing.

In this embodiment, when a cancellation operation is accepted by the second operation reception unit 54 during the default sequence, the progress of the default sequence is canceled, and the gas chromatograph 12 returns to the state before the default sequence is started.

Therefore, in this embodiment, the progress of the default sequence is canceled when a cancellation operation is accepted by the second operation reception unit 54 during the default sequence. Subsequently, when a progress operation is accepted by the first operation reception unit 52, the default sequence is started from the beginning. However, when a cancellation operation is accepted by the second operation reception unit 54 after the execution of the cooling processing, the cancellation operation is invalidated.

Further, in this embodiment, the presence or absence of a gas leakage may be determined in response to the completion of the default sequence. When the default sequence is completed, the valve 34 switches from the closed state to the open state, so that a carrier gas is supplied, and the presence or absence of a gas leakage is determined. The determination of the presence or absence of a gas leakage is performed using an atmospheric pressure sensor (not shown), but the method is not particularly limited.

When a gas leakage is detected, the default sequence starts in the middle thereof. In a case where the manual stop mode is set to a default maintenance mode, the default sequence starts immediately after the execution of the cooling processing, i.e., before the execution of the gas stop processing, and the gas stop processing is executed when a progress operation is accepted by the first operation reception unit 52. In a case where the automatic stop mode is set to a default maintenance mode, the default sequence starts immediately after the execution of the gas stop processing. When a gas leakage is detected, the notification unit 56 may notify the fact.

Further, in this embodiment, a case is exemplified in which only one first operation reception unit 52 is provided to the housing 20 of the gas chromatograph 12, but a plurality of first operation reception units 52 may be provided. In a case where a plurality of first operation reception units 52 is provided to the housing 20 of the gas chromatograph 12, the first operation reception units 52 accept a progress operation at different timings.

Further, in this embodiment, in a case where a detector requiring a reduced pressure, such as, e.g., a mass spectrometer, is used as the detector 28, it is preferable that the period during which the supply of the carrier gas is stopped be shorter in order to suppress the adverse effect due to the stop of the supply of the carrier gas. Therefore, in such a case, it is preferable to set a manual stop mode at which a carrier gas can be stopped immediately before the replacement of the maintenance component to a default maintenance mode.

Furthermore, in this embodiment, in a case where the maintenance component has already been cooled by the outside air or the like at the time of starting the default sequence, the execution of the cooling processing may be omitted. The determination of whether the maintenance component has already been cooled is made based on the detection temperature of the temperature sensor 50. Note that there is no particular limitation on how to determine whether the cooling of the maintenance component has been completed.

Further, the gas chromatograph 12 of this embodiment can be connected to a mass spectrometer (not shown). With this, various components separated by the column 26 can be introduced into the mass spectrometer.

The gas chromatograph 12 and the mass spectrometer are each provided with a connecting connector for electrically connecting to each other. Therefore, in the gas chromatograph 12, it is possible to determine whether the mass spectrometer is connected based on whether there is a signal via the connection connector.

Therefore, in a case where the gas chromatograph 12 is connected to the mass spectrometer, the manual stop mode may be set to the default maintenance mode, and in a case where the gas chromatograph 12 is detached from the mass spectrometer, the automatic stop mode may be set to the default maintenance mode.

Further, in this embodiment, the progress of the default sequence or the cancellation of the progress of the default sequence can be performed on the software installed on the user terminal 14.

5. Concrete Example of Electrical Configuration of Gas Chromatograph

Figure 5:
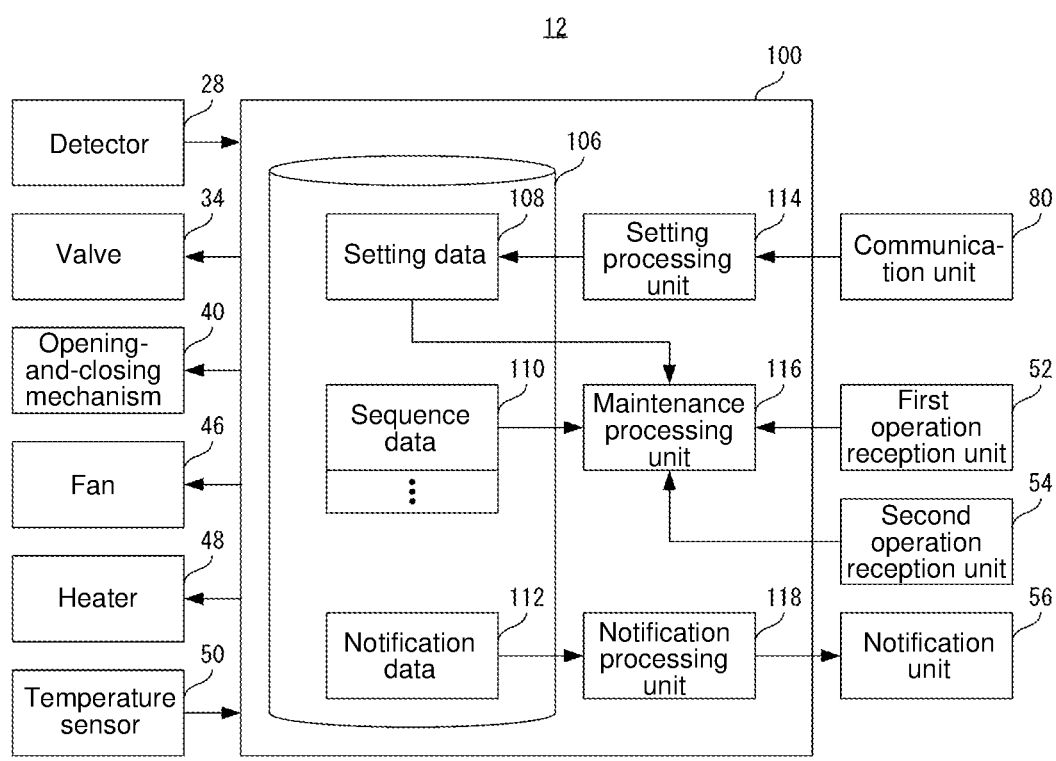
FIG. 5 is a functional block diagram showing a specific example of the electric configuration of the gas chromatograph of the embodiment.

FIG. 5 is a functional block diagram showing a concrete embodiment of the electrical configuration of the gas chromatograph 12 according to this embodiment. In FIG. 5, the illustrations of the RAM 104 and the like are omitted.

The storage unit 106 stores setting data 108, sequence data 110, notification data 112, and the like. The setting data 108 is data indicating the setting of the setting items related to the gas chromatograph 12. The setting data 108 includes data indicating at least the setting of the default maintenance mode.

The sequence data 110 is data indicating the maintenance sequence corresponding to the maintenance mode. The gas chromatograph 12 of this embodiment can set a plurality of maintenance modes, and therefore, a plurality of sequence data 110 is stored in the storage unit 106. However, instead of storing the plurality of sequence data 110 in the storage unit 106, the maintenance sequence corresponding to the default maintenance mode selected from the plurality of maintenance modes may be stored in the storage unit 106.

The notification data 112 is data to be used when notifying the progress status of the default sequence. As the notification data 112, for example, audio data, data indicating a light emission pattern of a lamp, and data indicating a message are used.

The controller 100 functions as the setting processing unit 114, the maintenance processing unit 116, the notification processing unit 118, and the like by the CPU 102 (see FIG. 4) executing programs.

In response to an input from the outside via the communication unit 80, the setting processing unit 114 sets any one of the plurality of maintenance modes to the default maintenance mode.

The maintenance processing unit 116 progresses the default sequence stepwise each time a progress operation is accepted by the first operation reception unit 52.

Further, the maintenance processing unit 116 cancels the progress of the default sequence when a cancellation operation is accepted by the second operation reception unit 54 during the default sequence. When the subsequent progress operation is accepted by the first operation reception unit 52, the default sequence is started from the beginning.

Further, when a cancellation operation is accepted by the second operation reception unit 54 after executing the cooling processing, the maintenance processing unit 116 invalidates the cooling operation.

Note that the maintenance processing unit 116 controls the valve 34, the opening-and-closing mechanism 40, the fan 46, the heater 48, and the like in accordance with the execution of the cooling processing, the gas stop processing, and the like.

The notification processing unit 118 notifies the progress status of the default sequence using the notification unit 56.

6. Flow

Figure 6:
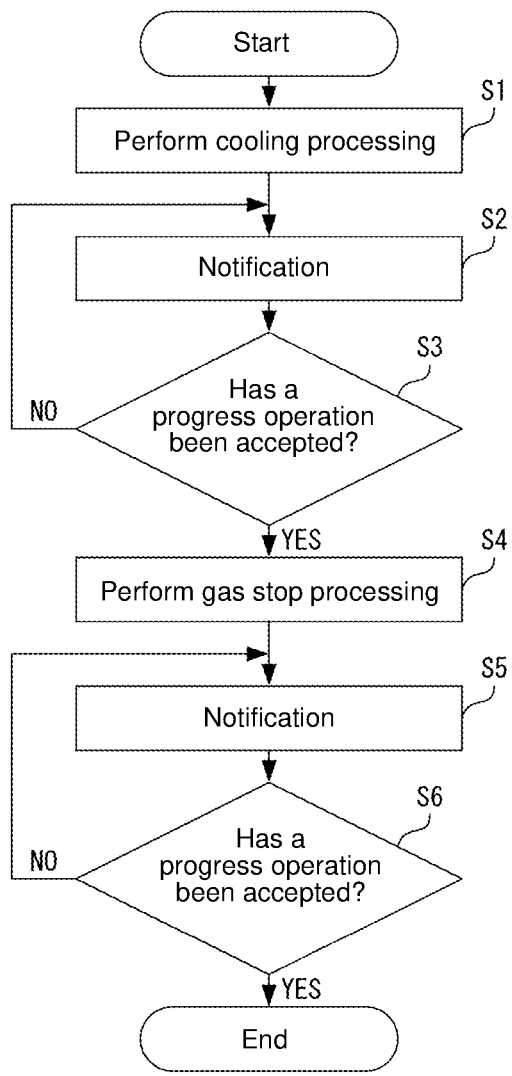
FIG. 6 is a flowchart showing one example of a progress operation of the gas chromatograph of the embodiment.

FIG. 6 is a flowchart showing one example of the progress operation of the gas chromatograph 12 according to this embodiment. The progress operation here is an operation of the gas chromatograph 12 related to the progress of the default sequence. FIG. 6 shows the progress operation of the gas chromatograph 12 in a case where a manual stop mode is set to the default maintenance mode.

When a progress operation is accepted by the first operation reception unit 52, the progress operation is started, and in Step S1, cooling processing is performed. In Step S2, the notification unit 56 notifies that the following progress operation can be accepted.

In Step S3, it is determined whether the progress operation has been accepted by the first operation reception unit 52. When it is "NO" in Step S3, that is, when the progress operation has not been accepted by the first operation reception unit 52, the process returns to Step S2, and the notification by the notification unit 56 is continued. On the other hand, when it is "YES" in Step S3, that is, when the progress operation has been accepted by the first operation reception unit 52, the gas stop processing is performed in Step S4, and the process proceeds to Step S5.

In Step S5, the notification unit 56 notifies that the replacement of the maintenance component can be performed, and the process proceeds to Step S6.

In Step S6, it is determined whether a progress operation has been accepted by the first operation reception unit 52. When it is "NO" in Step S6, that is, when the progress operation has not been accepted by the first operation reception unit 52, the process returns to Step S5, and the notification by the notification unit 56 is continued. On the other hand, when it is "YES" in Step S6, that is, when a progress operation has been accepted by the first operation reception unit 52, the progress operation ends.

Note that in a case where an automatic stop mode is set to a default maintenance mode, Step S2 and Step S3 will be omitted.

Figure 7:
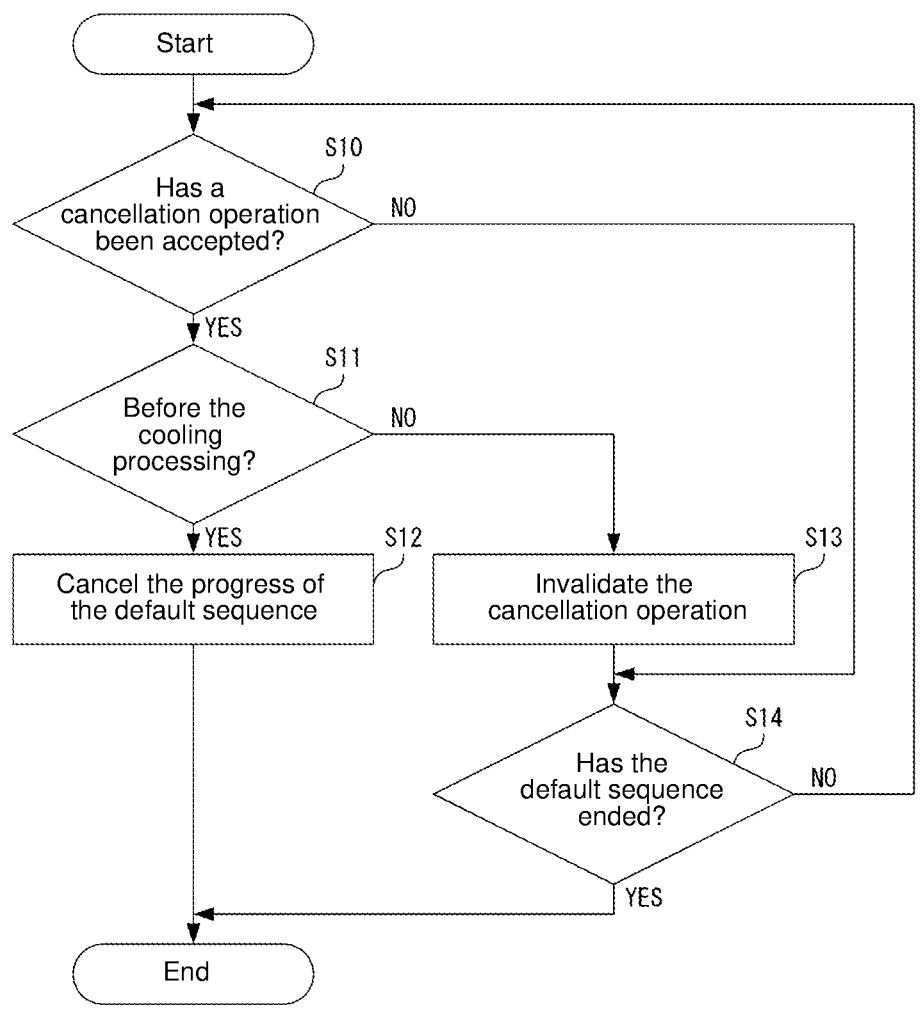
FIG. 7 is a flowchart showing one example of a cancellation operation of the gas chromatograph of the embodiment.

FIG. 7 is a flowchart showing one example of the cancellation operation of the gas chromatograph 12 according to this embodiment. The cancellation operation here is an operation of the gas chromatograph 12 related to the cancellation of the default sequence progress.

While the default sequence is in progress, in Step S10, it is determined whether a cancellation operation has been accepted by the second operation reception unit 54. When it is "NO" in Step S10, that is, when a cancellation operation has not been accepted by the second operation reception unit 54, the process proceeds to Step S14. On the other hand, when it is "YES" in Step S10, that is, when a cancellation operation has been accepted by the second operation reception unit 54, the process proceeds to Step S11.

In Step S11, it is determined whether it is before the execution of the cooling processing. When it is "NO" in Step S11, that is, it is after the execution of the cooling processing, the process proceeds to Step S13. On the other hand, when it is "YES" in Step S11, that is, when it is before the execution of the cooling processing, the process proceeds to Step S12.

In Step S12, the progress of the default sequence is canceled. In other words, the progress of the flow shown in FIG. 6 is canceled. When the default sequence progress is canceled in Step S12, the cancellation operation ends.

In Step S13, the cancellation operation is invalidated, and in Step S14, it is determined whether the default sequence has ended. When it is "NO" in Step S14, that is, when the default sequence has not ended, the process returns to Step S10. On the other hand, when it is "YES" in Step S14, that is, when the default sequence has ended, the cancellation operation ends.

It should be noted that the specific configuration and the like described in this embodiment is merely an example and can be appropriately changed depending on the actual product. Furthermore, the processing order of the Steps of the flowchart shown in this embodiment can be appropriately changed as long as the same result is obtained.

7. Aspects

It will be understood by those skilled in the art that the plurality of embodiments described above is illustrative of the following aspects.

Item 1

A gas chromatograph according to one aspect of the present invention relates to a gas chromatograph capable of setting a plurality of maintenance modes for a component provided in a housing, the gas chromatograph includes:
  a communication unit configured to communicate with an outside;
  a setting processing unit configured to set any one of the plurality of maintenance modes to a default maintenance mode in response to an input from the outside via the communication unit;
  a first operation reception unit provided in the housing, the first operation reception unit being configured to accept a progress operation for progressing a maintenance sequence corresponding to the default maintenance mode; and
  a maintenance processing unit configured to progress the maintenance sequence stepwise each time the progress operation is accepted by the first operation reception unit,
wherein the first operation reception unit is commonly used even in a case where any one of the plurality of maintenance modes is set to the default maintenance mode.

According to the gas chromatograph as recited in the above-described Item 1, any one of the plurality of maintenance modes can be set in advance to a default maintenance mode. Further, after setting the maintenance mode, the maintenance sequence can be progressed stepwise by the progress operation using the first operation reception unit commonly used in the plurality of maintenance modes. Therefore, the maintenance of the component can be progressed by a simple operation on the device body.

Item 2

In the gas chromatograph as recited in the above-described Item 1, the gas chromatograph may further include:
  a notification processing unit configured to notify a user of a progress status of the maintenance sequence.

According to the gas chromatograph as recited in the above-described Item 2, it is possible to assuredly progress the maintenance of the component while confirming the progress status of the maintenance sequence based on the notification.

Item 3

In the gas chromatograph as recited in the above-described Item 1 or 2,
  the plurality of maintenance modes may include:
  a maintenance mode for stopping a gas supply by accepting the progress operation by the first operation reception unit; and
  a maintenance mode for automatically stopping the gas supply without accepting the progress operation by the first operation reception unit.

According to the gas chromatograph as recited in the above-described Item 3, when performing the maintenance of the component of the gas chromatograph, the supply of the carrier gas is manually or automatically stopped according to the maintenance mode set as a default maintenance mode. Therefore, the optimum maintenance mode can be set as a default maintenance mode by selecting the maintenance mode according to the characteristics of the component constituting the gas chromatograph or the device to be connected to the gas chromatograph.

Item 4

In the gas chromatograph as recited in the above-described any one of the above-described Items 1 to 3,
  the housing may be provided with only one unit as the first operation reception unit.

According to the gas chromatograph described in the above-described Item 4, since the maintenance sequence is progressed by the progress operation for one first operation reception unit, the maintenance of the component can be progressed by a simpler operation on the device body. This makes it easier for anyone unfamiliar with a gas chromatograph maintenance to proceed with the maintenance sequence.

Item 5

In the gas chromatograph as recited in any one of the above-described Items 1 to 4, the gas chromatograph may further include:
  a second operation reception unit provided in the housing, the second operation reception unit being configured to accept a cancellation operation for canceling progress of the maintenance sequence.

According to the gas chromatograph described in the above-described Item 5, the progress of the maintenance sequence can be canceled by operating the second operation reception unit as needed.

Item 6

In the gas chromatograph as recited in the above-described Item 5,
the maintenance processing unit may be configured to cancel the progress of the maintenance sequence in a case where the cancellation operation is accepted by the second operation reception unit during the maintenance sequence and start the maintenance sequence from the beginning in a case where the progress operation is sequentially accepted by the first operation reception unit.

According to the gas chromatograph of the above-described Item 6, after canceling the progress of the maintenance sequence, the maintenance sequence can be started from the beginning.

Item 7

In the gas chromatograph as recited in the above-described Item 6, it may be configured such that
the maintenance sequence includes cooling processing for cooling the component, and
in a case where the cancellation operation is accepted by the second operation reception unit after the cooling processing, the maintenance processing unit invalidates the cancellation operation.

According to the gas chromatograph as recited in the above-described Item 7, it is possible to prevent the maintenance sequence from being erroneously canceled after executing the cooling processing. In other words, it is possible to prevent repeated cooling processing from being executed due to incorrect cancellation of the maintenance sequence.

Item 8

In the gas chromatograph as recited in any one of the above-described Items 1 to 7,
the component may be any one of a sample introduction unit, a column, and a detector.

According to the gas chromatograph as recited in the above-described Item 8, the maintenance of the sample introduction unit, the detector, or the column can be performed by a simple operation on the device body.

The invention claimed is:

1. A gas chromatograph capable of setting a plurality of maintenance modes to maintain respective components provided in a housing, comprising:
communication circuitry configured to communicate with an outside;
a setting processor configured to set any one of the plurality of maintenance modes as a default maintenance mode in response to an input from the outside via the communication circuitry;
a first operation reception button provided on the housing, the first operation reception button being configured to accept a progress operation for progressing a default maintenance sequence of the default maintenance mode; and
a maintenance processor configured to progress the default maintenance sequence stepwise to a next step of a plurality of default maintenance sequence steps each time the progress operation is accepted by the first operation reception button,
wherein the maintenance processor is configured to progress the maintenance sequence by operation of the first operation reception button even in a case where any one of the plurality of maintenance modes is set as the default maintenance mode.

2. The gas chromatograph as recited in claim 1, further comprising:
a notification processor configured to notify a user of a progress status of the maintenance sequence.

3. The gas chromatograph as recited in claim 1,
wherein the plurality of maintenance modes includes:
a first maintenance mode comprising a first maintenance sequence for stopping a gas supply by accepting the progress operation by the first operation reception button; and
a second maintenance mode comprising a second maintenance sequence for automatically stopping the gas supply without accepting the progress operation by the first operation reception button.

4. The gas chromatograph as recited in claim 1,
wherein the housing is provided with only one button as the first operation reception button.

5. The gas chromatograph as recited in claim 1, further comprising:
a second operation reception button provided on the housing, the second operation reception unit button being configured to accept a cancellation operation for canceling progress of the default maintenance sequence.

6. The gas chromatograph as recited in claim 5,
wherein the maintenance processor is configured to cancel the progress of the default maintenance sequence in a case where the cancellation operation is accepted by the second operation reception button during the default maintenance sequence and start the default maintenance sequence from the beginning in a case where the progress operation is later accepted by the first operation reception button.

7. The gas chromatograph as recited in claim 6,
wherein the default maintenance sequence includes cooling processing for cooling the component, and
wherein in a case where the cancellation operation is accepted by the second operation reception button after the cooling processing has started, the maintenance processor invalidates the cancellation operation.

8. The gas chromatograph as recited in claim 1,
wherein the component is any one of a sample introduction unit, a column, and a detector.

9. A gas chromatograph capable of setting a plurality of maintenance modes to maintain a corresponding component provided in a housing, comprising:
a communication unit configured to communicate with an outside;
a setting processing unit configured to set any one of the plurality of maintenance modes as a default maintenance mode in response to an input from the outside via the communication unit, each of the plurality of maintenance modes comprising a corresponding maintenance sequence of steps, wherein the setting of the default maintenance mode provides a default maintenance sequence;

a first operation reception unit provided on the housing, the first operation reception unit being configured to accept a progress operation for progressing the default maintenance sequence of the default maintenance mode to the next step of the default maintenance sequence; and a maintenance processing unit configured to progress the default maintenance sequence stepwise to the next step of the default maintenance sequence each time the progress operation is accepted by the first operation reception unit, wherein maintenance processing unit is configurable by each of the plurality of maintenance modes to progress the corresponding maintenance sequence of the corresponding maintenance mode in response to the first operation reception unit accepting a progress operation when the corresponding maintenance mode is set as the default maintenance mode.

10. The gas chromatograph as recited in claim 9, wherein each of the maintenance sequence of steps of the plurality of maintenance modes includes a step for stopping a gas supply to the gas chromatograph.

11. The gas chromatograph as recited in claim 9, further comprising a storage unit for storing sequence data indicating the default maintenance sequence for the default maintenance mode.

12. The gas chromatograph as recited in claim 9, further comprising a storage unit for storing sequence data indicating a corresponding maintenance sequence for each of the plurality of maintenance modes.

13. The gas chromatograph as recited in claim 9, further comprising:
a notification unit on the housing; and
a notification processing unit configured cause the notification unit to notify a user of a progress status of the maintenance sequence, wherein the notification processing unit is configured to cause the notification unit to notify a user that replacement of the component can be performed.

14. The gas chromatograph as recited in claim 9, further comprising a storage unit for storing sequence data indicating a corresponding maintenance sequence for each of the plurality of maintenance modes, including a first maintenance mode and a second maintenance mode, wherein the first maintenance mode comprises a first maintenance sequence for stopping a gas supply by accepting the progress operation by the first operation reception unit; and a second maintenance mode comprises a second maintenance sequence for automatically stopping the gas supply without accepting the progress operation by the first operation reception unit.

15. The gas chromatograph as recited in claim 9, wherein the first operation reception unit is a single button and only operation of the single button is needed to accept the progress operation for progressing the default maintenance sequence.

16. The gas chromatograph as recited in claim 9, further comprising:
a second operation reception unit provided on the housing, the second operation reception unit being configured to accept a cancellation operation for canceling progress of the default maintenance sequence.

17. The gas chromatograph as recited in claim 16, wherein the maintenance processing unit is configured to cancel the progress of the default maintenance sequence in a case where the cancellation operation is accepted by the second operation reception unit during the default maintenance sequence and start the default maintenance sequence from the beginning in a case where the progress operation is later accepted by the first operation reception unit.

18. The gas chromatograph as recited in claim 17, wherein the default maintenance sequence includes a cooling processing step for cooling the component, and
wherein in a case where the cancellation operation is accepted by the second operation reception unit after the cooling processing step, the maintenance processing unit invalidates the cancellation operation.

19. The gas chromatograph as recited in claim 9, wherein the component is any one of a sample introduction unit, a column, and a detector.

* * * * *